United States Patent [19]
Dogliani

[11] Patent Number: 4,948,194
[45] Date of Patent: Aug. 14, 1990

[54] FLEXIBLE ROOF FOR A CONVERTIBLE MOTOR VEHICLE, PROVIDED WITH A SAFETY HOOK FOR THE REAR ARCH OF THE ROOF FRAME

[75] Inventor: Enrico Dogliani, Pecetto, Italy

[73] Assignee: Industrie Pininfarina S.p.A., Turin, Italy

[21] Appl. No.: 378,146

[22] Filed: Jul. 11, 1989

[30] Foreign Application Priority Data

Jul. 11, 1988 [IT] Italy ............................ 53292/88[U]

[51] Int. Cl.⁵ ............................................. B60J 7/00
[52] U.S. Cl. .................................... 296/108; 296/116; 296/120.1
[58] Field of Search ............... 296/108, 107, 116, 117, 296/120.1, 121, 122

[56] References Cited

U.S. PATENT DOCUMENTS

| 2,169,340 | 8/1939 | Falcon | 296/107 |
| 4,573,732 | 3/1986 | Muscat | 296/108 |
| 4,695,089 | 9/1987 | Fukutomi | 296/107 |
| 4,778,215 | 10/1988 | Ramaciotti | 296/107 |
| 4,784,428 | 11/1988 | Moy et al. | 296/107 |

FOREIGN PATENT DOCUMENTS 246201 3/1987 European Pat. Off. .

Primary Examiner—Robert R. Song
Attorney, Agent, or Firm—Christie, Parker & Hale

[57] ABSTRACT

The flexible roof is movable between an extended position in which it covers the passenger compartment and a folded position. It is provided with a pivoted framework comprising a main arched structure carrying anchoring pins and a rear arched member carrying catch devices which can engage the anchoring pins. Hooks are connected to the body of the motor-vehicle and engage the pins when the roof is extended so as to prevent the structure from pivoting. The hooks are released from the pins by the catch devices when the catch devices engage the pins so as to enable the structure and the arch to pivot freely together.

4 Claims, 3 Drawing Sheets

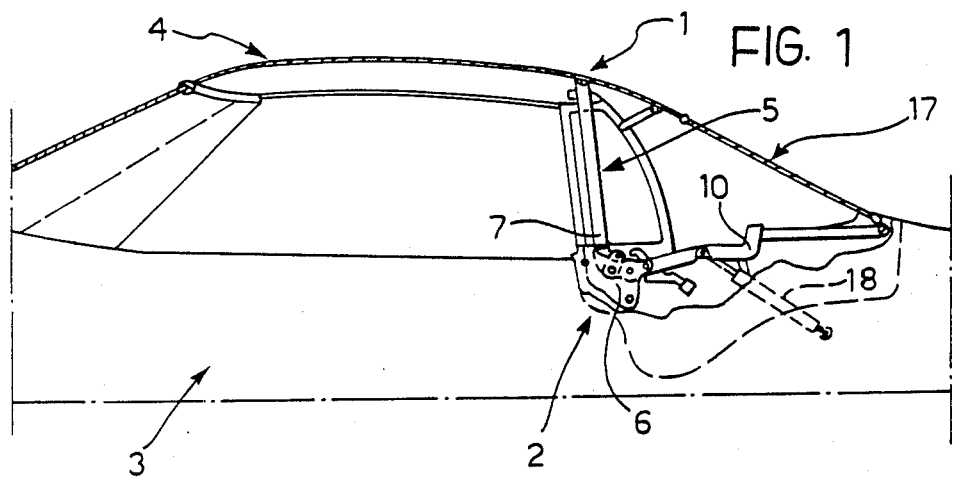
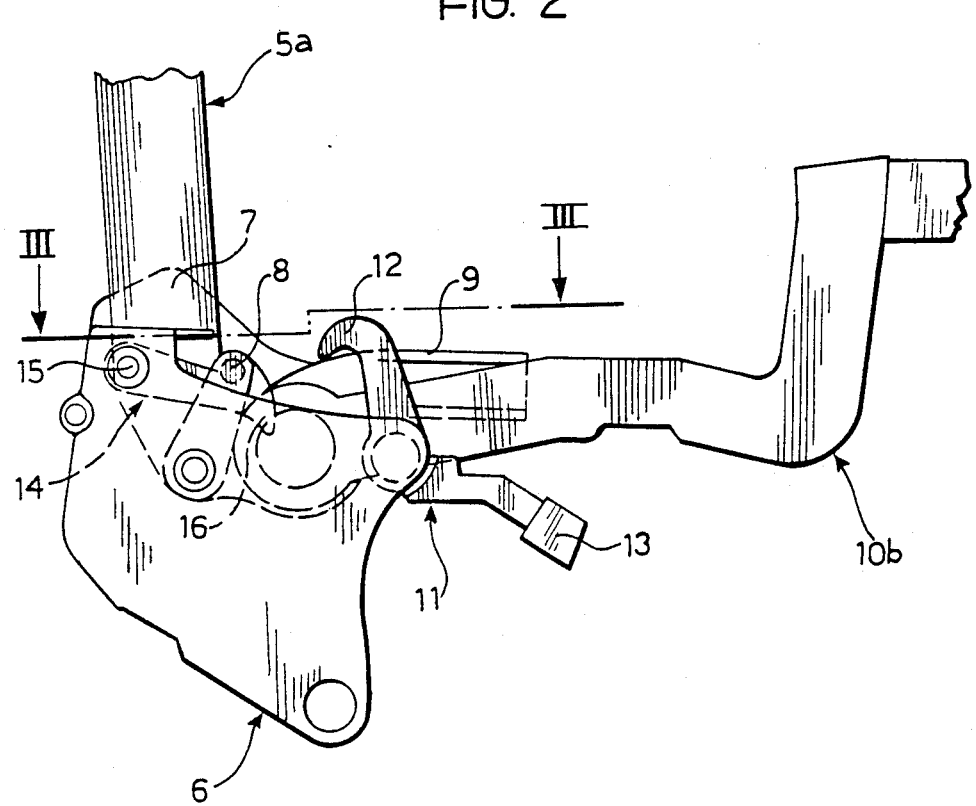

4,948,194

FLEXIBLE ROOF FOR A CONVERTIBLE MOTOR VEHICLE, PROVIDED WITH A SAFETY HOOK FOR THE REAR ARCH OF THE ROOF FRAME

FIELD OF THE INVENTION

The present invention relates to flexible roofs for convertible motor vehicles.

BACKGROUND AND SUMMARY OF THE INVENTION

The prior art in this field provides essentially two types of roof: a first type is characterized in that the lower part of the rear window, or the frame which supports it, is connected permanently to the body work, and a second type is characterized in that the lower part of the rear window, or the frame which supports it, is connected to a structure which is movable relative to the body work.

The present invention relates to a roof of the second type. In particular, the invention concerns a flexible roof for a convertible motor vehicle which is movable between an extended position in which it covers the passenger compartment of the motor vehicle and a folded, noncovering position, the flexible cover comprising:

a pivoted framework for connection to the motor-vehicle body;

a flexible fabric cover associated with the framework;

a main arched structure which forms part of the framework and is articulated at its ends to respective supports connected to the motor vehicle body, the main structure being movable between a vertical position in which the roof is extended and a horizontal position in which the roof is folded, the ends each carrying an anchoring pin and a bracket;

a rear arch which forms part of the framework and is articulated at its ends to the bracket, the rear arch being movable between a horizontal position and a vertical position substantially adjacent that of the main structure, the rear arch carrying a catch device which can engage the anchoring pin of the main arch structure when the rear arch is in the vertical position.

A roof of the type indicated is described in Italian patent application No. 67,217-A/86 and in the corresponding European patent application No. 0 246201. In order to move such a roof from its extended position to its folded position and to place the folded roof in a housing compartment provided in the body work, it is necessary to bring the rear arch, which is normally in a horizontal position, to a vertical position adjacent that of the main arched structure in which its catch device engages the pin carried by the main arch structure. The unit formed by the structure and the arch which are now firmly fixed together can then be pivoted to the horizontal position, causing the roof to disappear into its housing.

Some careless users, however, neglect to bring the rear arch into the vertical position before pivoting the main arched structure and thus cause serious damage to the roof. In fact this incorrect maneuver causes an irregular movement of the rear arch which interferes with other parts of the roof.

The object of the present invention is to provide an improved type of flexible roof for convertible motor vehicles in which it is not possible to carry out incorrect maneuvers during the folding operation.

The subject of the invention is a roof of the type indicated above, characterized in that it includes a hook mounted on each support, the hook engaging the anchoring pin when the main arched structure is in the vertical position so as to prevent the main arched structure from pivoting, the hook being released from the anchoring pin by the catch device of the rear arched member when the catch device engages the anchoring pin so as to enable the first arched element to pivot freely.

BRIEF DESCRIPTION OF THE DRAWINGS

Further characteristics and advantages of the present invention will become clear from the detailed description which follows with the aid of the appended drawings, provided by way of non-limiting example, in which:

FIG. 1 is a side view of a flexible roof according to the invention mounted on a motor vehicle;

FIG. 2 is a side view of a detail of the roof of FIG. 1 on an enlarged scale;

DETAILED DESCRIPTION

Figure 3:
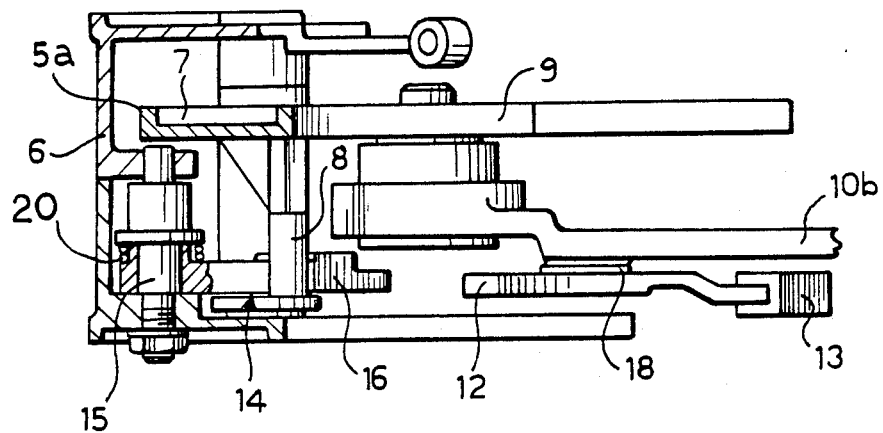
FIG. 3 is a plan view of the detail of FIG. 2.

A flexible roof 1 for a convertible motor vehicle, which is movable between an extended position in which it covers the passenger compartment of a motor vehicle and a folded, non-covering position, includes a pivoted framework 2 for connection to the body 3 of the motor vehicle and a flexible fabric covering 4 associated with the framework 5. The roof 1 also includes a rigid, glass, rear window 17 which is movable, as a result of the movement of the roof 1, between a raised position, in which it follows the shape of the extended roof 1, and a lowered position in which it is housed within the passenger compartment of the motor vehicle. This and other details of the roof which are not essential for an understanding of the present invention are described in detail in Italian patent application No. 67217-A/86 which corresponds to European patent application No. 0246201 and is included in the present specification by way of reference.

The framework 1 includes a main arch structure 5 (FIGS. 2 to 5) which is articulated at its ends 7 to respective supports 6 connected to the body 3 of the motor vehicle so as to be able to pivot from a vertical position 5a, in which the roof is extended, to a horizontal position 5b in which the roof is folded. Each end 7 also carries an anchoring pin 8 and a bracket 9.

The framework 2 includes a rear arch 10 which is articulated at its ends to the bracket 9 so as to be pivotable from a horizontal position 10b to a vertical position 10a substantially alongside that 5a of the main arched structure 5. The rear arch 10 carries a catch device 11 with a rocker-arm structure which has an end 12 for engaging the pin 8 of the main arched structure 5 towards which it is urged by a spring 18 and a hand-grip end 13 for its manual operation.

An elongate hook 14 is pivoted on each support 6 by a first end 15 and has a second, active end 16 for engaging the anchoring pin 8 towards which it is normally urged by a spring 20.

When the fabric cover 4 is in the extended position, the main arch structure 5 is in its vertical position, locked by the hook 14 whose active end 16 engages the anchoring pin 8 of the structure 5, and the rear arch 10 is in the horizontal position 10b (FIG. 2).

Figure 5:
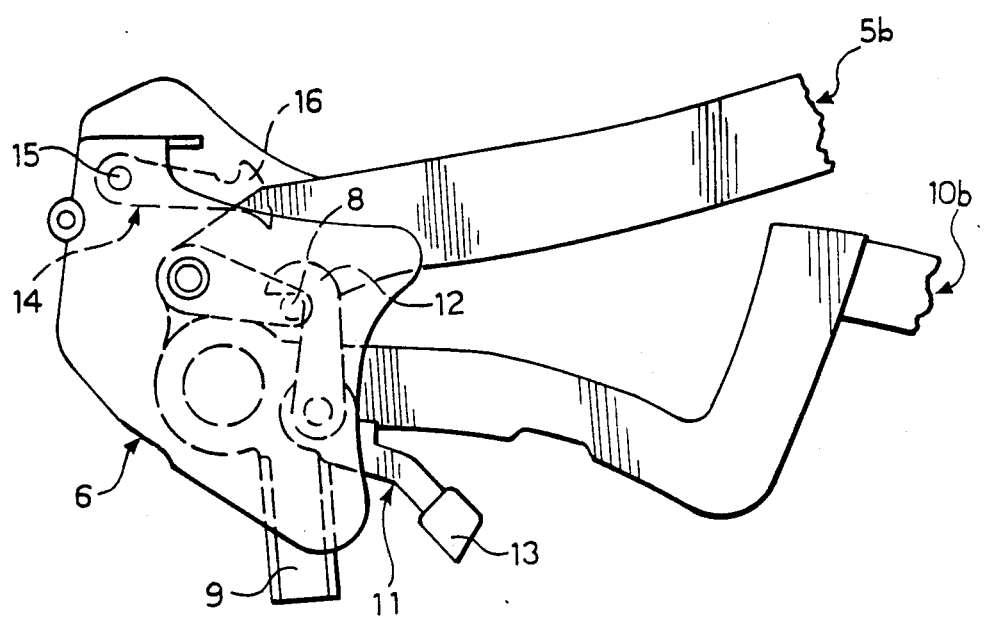
FIG. 5 is a side view of the detail of FIG. 2 in yet another operating position.
Figure 4:
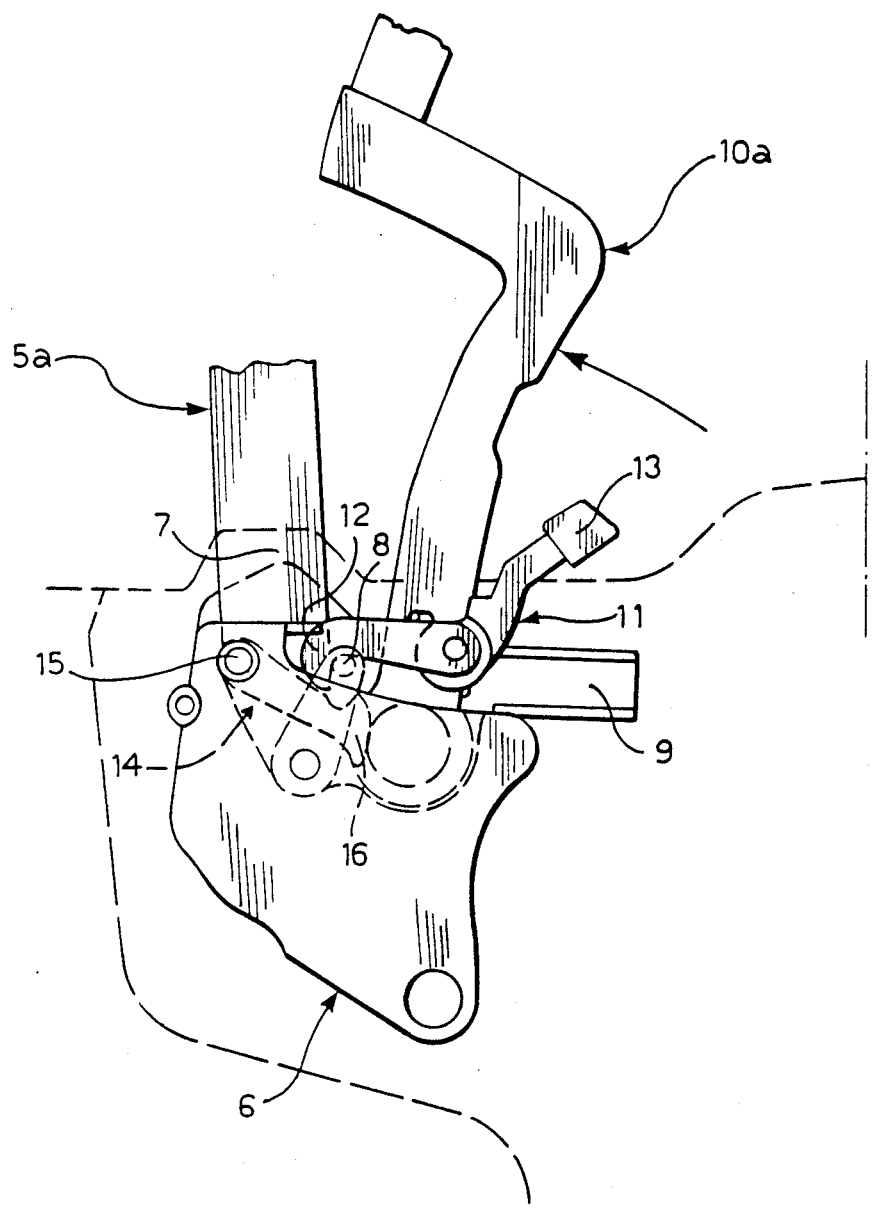
FIG. 4 is a side view of the detail of FIG. 2 in another operating position.

If the fabric cover 4 is to be folded, the rear arch 10 is raised to a vertical position 10a adjacent that 5a of the main arch structure 5. The end 12 of the catch device 11 of the rear arch 10 thus engages the anchoring pin 8, releasing the end 16 of the hook 14 therefrom (FIG. 4). The structure 5 and the arch 10 are thus firmly fixed together and can then be pivoted into a horizontal position 5b, 10b, without being obstructed by the hook 14, so as to cause the flexible roof 1 to fold (FIG. 5).

When it is wished to return the roof 1 to the extended condition, it suffices to operate the catch device 11 manually by means of the grip 13 to release the main arch structure 5 which can then be returned to its vertical position 5a.

From the above, it is clear that it is impossible to pivot the main arch structure 5 to the horizontal position 5b unless the rear arch 10 has first been brought to the vertical position 10a. Damage due to the incorrect carrying out of the maneuver is thus avoided.

A further advantage of the roof according to the invention lies in the fact that the movement of the main structure and of the rear arch can be achieved automatically with a single actuator.

For example, a single electrically- or pneumatically-operated actuator (indicated in broken outline at 18 in FIG. 1) which acts on the rear arch may be provided. Enabling levers, not illustrated, are also provided for enabling the actuator 18 to act only at the right moment on other parts of the roof.

During the folding stage, once the arch 10 has been released from the body 3, the actuator 18 acts first on this arch and moves it from the horizontal position 10b to the vertical position 10a, and then causes the whole roof 1 to fold.

In fact, once it is in the vertical position 10a, the arch 10 is hooked by means of the catch device 11 to the main arched structure 5, which is in turn connected to the framework 2 of the cover 1 and transmits thereto the drive imparted to it by the actuator 18. Obviously the same steps occur in reverse order during the unfolding of the roof 1.

I claim:
1. A flexible roof for convertible motor vehicles which is movable between an extended position in which it covers the passenger compartment of a motor vehicle and a folded, non-covering position, the flexible roof comprising:
   a pivoted framework for connection to the body of the motor vehicle;
   a flexible fabric cover associated with the framework;
   a main arched structure which forms part of the framework and is articulated at its ends to respective supports connected to the motor vehicle body, the main structure being movable between a vertical position in which the roof is extended and a horizontal position in which the roof is folded, the ends each carrying an anchoring pin and a bracket;
   a rear arched member which forms part of the framework and is articulated at its ends to the bracket, the arch being movable between a horizontal position and a vertical position substantially beside that of the main arch structure, the rear arch carrying a catch device which can engage the anchoring pin of the main arch structure when the rear arch is in its vertical position; and
   the roof being characterized in that it includes a hook mounted on each support, the hook engaging the anchoring pin when the main arch structure is in the vertical position so as to prevent the main arch structure from pivoting, the hook being released from the anchoring pin by the catch device of the rear arch when the catch device engages the anchoring pin so as to enable the structure and the arch to pivot freely together.

2. A roof according to claim 1 characterized in that the hook is elongate and has a first end pivoted on the support and a second, active end for engagement with the anchoring pin.

3. A roof according to claim 2 characterized in that the hook is provided with a spring which normally urges it into engagement with the anchoring pin.

4. A roof according to claim 1, 2 or 3 characterized in that it includes a single actuator which acts on the rear arch for automating the folding and unfolding of the roof.

* * * * *